United States Patent

[11] 3,622,218

[72] Inventor Hans Gerhard Kruger
Neckarsteinach, Germany
[21] Appl. No. 882,999
[22] Filed Dec. 8, 1969
[45] Patented Nov. 23, 1971
[73] Assignee Eltro GmbH & Co.
Heidelberg, Germany
[32] Priority Dec. 6, 1968
[33] Germany
[31] P 18 13 085.3

[54] TWO-ELEMENT OBJECTIVE FOR USE IN THE INFRARED RANGE
3 Claims, 1 Drawing Fig.
[52] U.S. Cl. ........................................... 350/2,
350/165, 350/195, 350/232
[51] Int. Cl. ............................................... G02b 3/00,
G02b 1/00, G02b 9/10
[50] Field of Search ................................. 350/2, 165, 195, 232

[56] References Cited
UNITED STATES PATENTS
| | | | |
|---|---|---|---|
| 2,512,257 | 6/1950 | Pfund | 350/2 |
| 3,035,490 | 5/1962 | Tibbetts | 350/2 |
| 3,439,969 | 4/1969 | Kirkpatrick | 350/2 |

FOREIGN PATENTS
| | | | |
|---|---|---|---|
| 0547,159 | 10/1957 | Canada | 350/164 |

OTHER REFERENCES
Allen E. Murray, " An All Intran Doublet Objective," Applied Optics, Vol. 4, No. 2, Feb. 1965, (350/2)
Joseph Jerger, Jr., " Infrared Optical Systems are Design Problems," Optical Spectra, Vol. 1, No. 2, April–June 1967.

*Primary Examiner*—David Schonberg
*Assistant Examiner*—Paul A. Sacher
*Attorney*—Waters, Roditi, Schwartz and Nissen

ABSTRACT: A two-element objective for operation in the infrared range of $8\mu$ and $14\mu$ is constituted by a convex-concave front condensing lens of cesium bromide spaced in front of a rear dispersive lens of polycrystalline zinc sulfide fritted under pressure. The objective has a resolving power of 0.8 milliradians on the optical axis with an aperture ratio of 1:2.5.

PATENTED NOV 23 1971    3,622,218
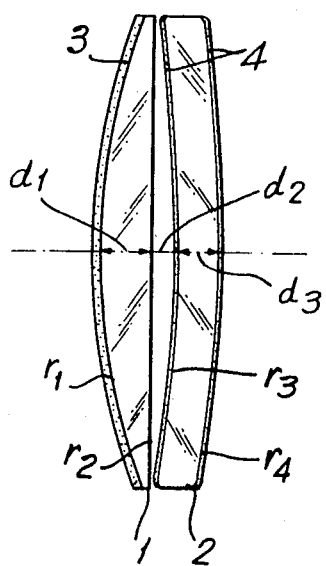

TWO-ELEMENT OBJECTIVE FOR USE IN THE INFRARED RANGE

BRIEF DESCRIPTION OF THE DRAWING

The sole FIGURE of the drawing is a cross-sectional view taken through the objective according to the invention.

DESCRIPTION OF THE INVENTION

The invention relates to a two-element objective for utilization in the mean infrared range, chiefly in the spectral region from $8\mu$ to $14\mu$, and which with an aperture ratio of 1:2.5 has a resolving power of about 0.8 milliradians on the optical axis.

Image-forming optical systems are already known, functioning in the mean infrared range. One achromatized, three-element system is composed of a combination of a silicon element, an arsenic trisulfide element and another silicon element, for operation in the spectral region from $2.7\mu$ to $11.0\mu$. Another embodiment of an optical system comprises a two-element objective in which the elements are magnesium fluoride and zinc sulfide chromatically corrected in the spectral region from $3.0\mu$ to $5.0\mu$.

An object of the invention is to provide a chromatically corrected system suitable for locational and image-forming functions in the atmosphere from $8\mu$ to $14\mu$.

According to the invention, the objective is constructed of a cesium bromide (CsBr) condensing lens 1 in front followed by a dispersive lens 2 of polycrystalline zinc sulfide (ZnS) fritted under pressure, constituting a two-element achromatic objective with air separation.

The materials used for this invention are readily permeable to radiation in the spectral region from $8\mu$ to $14\mu$. In the arrangement according to the invention, the lens elements make possible the construction of a two-element objective achromatically corrected for the stated range.

An embodiment of an objective is next described in detail with reference to the attached drawing and the following table, in which the objective has a focal length of 100 mm. and operates on a $10\mu$ wavelength.

| Lens | Radii (mm.) | Axial thickness (mm.) | Materials | $n_{10\mu}$ | $\gamma_{10\mu}$ |
|---|---|---|---|---|---|
| 1 | $r_1 = +57.40$<br>$r_2 = -3069.5$ | $d_1 = 4.39$ | CsBr | 1.66251 | 80.2 |
| 2 | $r_3 = -90.93$<br>$r_4 = -105.98$ | $d_2 = 2.19$<br>$d_3 = 4.39$ | ZnS | 2.1986 | 17.0 | wherein:

$n_{10\mu}$ denotes the refractive index on a wavelength of $10\mu$ and $\gamma_{10\mu}$ is the infrared Abbe index for the spectral region under discussion and is defined as follows:

$$\gamma_{10\mu} = \frac{n_{10\mu} - 1}{n_{8\mu} - n_{14\mu}}$$

where $n_{8\mu}$ and $n_{14\mu}$ denote the refractive indexes at wave lengths $8\mu$ and $14\mu$ respectively.

Due to the comparatively high solubility of cesium bromide in water it is preferred in the case of an infrared objective according to the invention (intended for use in the open air) to coat, at least the CsBr surface exposed to atmospheric action, with a protective film 3 which is substantially impervious to water but is readily permeable to radiation in the spectral range of operation.

By way of example, such a layer may be a polymerized hydrocarbon such as Lupolen 1810H (a branched polyethylene produced by polymerization of ethylene at high pressure) or a polymerized fluorocarbon such as Teflon.

There will be advantage in applying antireflecting interference coatings, especially on the highly refractive zinc sulfide lens, and for instance $\lambda/4$ barium fluoride layers 4 can be employed.

What is claimed is:

1. An achromatic two-lens objective for the infrared range, comprising; a front condensing lens formed of cesium bromide, wherein said lens has a front surface exposed to the atmosphere and includes a protective coating on said front surface impervious to water and permeable to radiation of a wavelength between $8\mu$ and $14\mu$, and a rear dispersive lens constituted of polycrystalline zinc sulfide frittered under pressure spaced from said condensing lens so as to provide air separation therebetween, the combination of said condensing and dispersive lenses forming an infrared range objective between $8\mu$ and $14\mu$ and having a resolving power of about 0.8 milliradians on the optical axis with an aperture ratio of about 1:25.

2. An objective as claimed in claim 1 wherein said lens has the following data in mm.:

$f = 100$

| Lens | Radii | Axial thickness | $n_{10\mu}$ | $\gamma_{10\mu}$ |
|---|---|---|---|---|
| Front | $r_1 = +57.40$<br>$r_2 = -3069.5$ | $d_1 = 4.39$<br>$d_2 = 2.19$ | 1.66251 | 80.2 |
| Rear | $r_3 = -90.93$<br>$r_4 = -105.98$ | $d_3 = 4.39$ | 2.1986 | 17.0 | wherein:
$d_1$ is the thickness of the front lens;
$d_2$ is the spacing of the lenses;
$d_3$ is the thickness of the rear lens;
$n_{10\mu}$ is the refractive index at a wavelength of $10\mu$; and
$\gamma_{10\mu}$ is the Abbe index.

3. An objective as claimed in claim 2 wherein the Abbe index $\gamma_{10\mu}$ is $$\frac{n_{10\mu m} - 1}{n_{8\mu m} - n_{14\mu m}}$$

wherein:
$n_{8\mu}$ and $n_{14\mu}$ are the refractive indexes at wavelengths of $8\mu$ and $14\mu$ respectively.

* * * * *